United States Patent [19]

Nakamura et al.

[11] Patent Number: 5,255,319
[45] Date of Patent: Oct. 19, 1993

[54] NOISE SUPPRESSING CIRCUIT IN AN FM TUNER

[75] Inventors: Tetsuo Nakamura; Masahide Terada, both of Saitama, Japan

[73] Assignee: Pioneer Electronic Corporation, Tokyo, Japan

[21] Appl. No.: 677,184

[22] Filed: Mar. 29, 1991

[30] Foreign Application Priority Data

Sep. 26, 1990 [JP] Japan .................. 2-256525

[51] Int. Cl.⁵ .............................................. H04H 5/00
[52] U.S. Cl. .................................... 381/13; 381/7; 455/212; 455/222; 455/223
[58] Field of Search ............ 381/7, 13; 455/222, 455/223, 205, 212, 225

[56] References Cited

U.S. PATENT DOCUMENTS

| | | | |
|---|---|---|---|
| 4,066,845 | 1/1978 | Kishi | 381/13 |
| 4,314,377 | 2/1982 | Kondo et al. | 381/13 |
| 4,419,541 | 12/1983 | Kishi et al. | 381/7 |

Primary Examiner—John K. Peng
Assistant Examiner—Edward Lefkowitz
Attorney, Agent, or Firm—Nikaido, Marmelstein, Murray & Oram

[57] ABSTRACT

A noise suppressing circuit has a gate for controlling a composite signal applied to a stereo demodulator of an FM tuner, and a detector for detecting a noise included in the composite signal and for producing a noise dependent signal for controlling the gate to close it. A pilot signal detector is provided for detecting a pilot signal included in the composite signal for producing a pilot dependent pulses. In response to the noise dependent signal and to the pilot dependent pulses, gate control pulses are applied to the gate, thereby closing the gate in synchronism with the pilot signal.

5 Claims, 5 Drawing Sheets

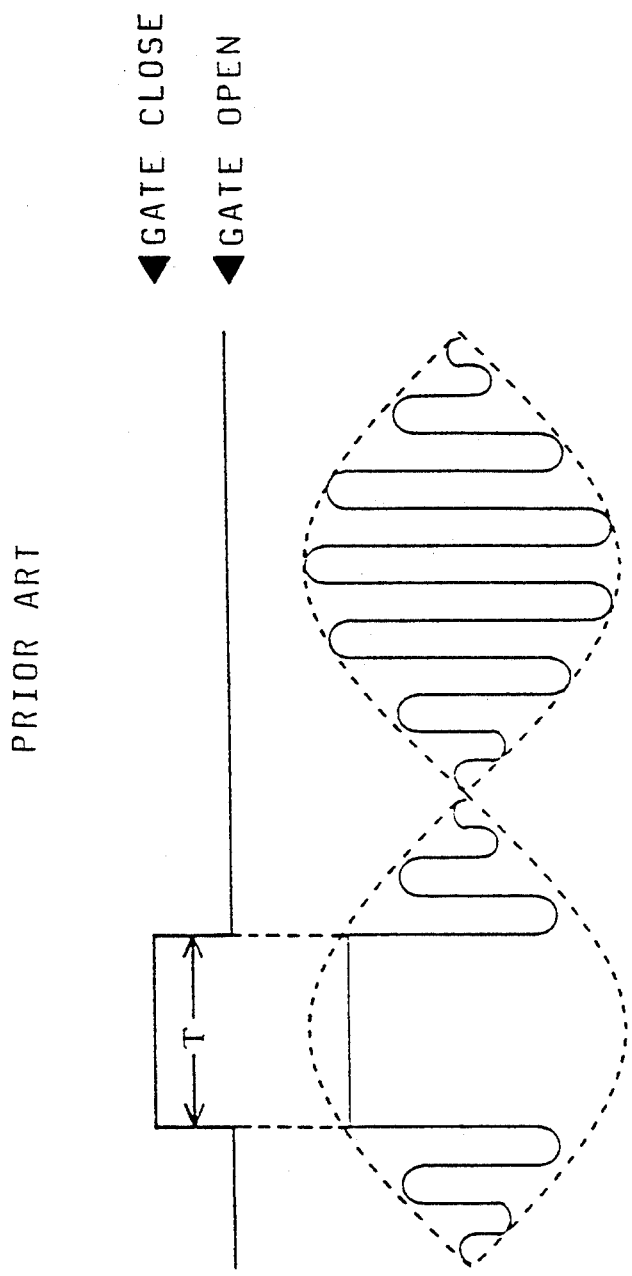

NOISE SUPPRESSING CIRCUIT IN AN FM TUNER

BACKGROUND OF THE INVENTION

The present invention relates to a noise suppressing circuit for suppressing pulse noise and multipath noise in an FM tuner.

In order to avoid radio disturbances in the FM tuner caused by various types of noise such as pulse noise and multipath noise, there are available various systems that have been incorporated into FM tuners.

FIG. 3 shows a conventional noise suppressing circuit. A composite signal obtained through a front end, an intermediate frequency amplifier and a detector (not shown) of the FM tuner is applied to a delay circuit 1 for delaying the signal. The delayed signal is applied to a gate 3 through a buffer amplifier 2. At the same time the composite signal is applied to a level detector 5 through a high-pass filter 4. The level detector 5 detects noise so as to produce output signals for closing the gate 3. The composite signal passes through the opened gate 3 and is charged in a capacitor C.

FIG. 4 shows the voltage at the capacitor C. If the noise N is included in the composite signal, the gate 3 is closed, so that the capacitor C holds the voltage during a period T corresponding to the overlapping period of the noise N as shown in FIGS. 5a and 5b. Thus, the composite signal is cut off for the period T.

The composite signal from the gate 3 is applied to a stereo demodulator 7 through a buffer amplifier 6. The composite signal is demodulated by the stereo demodulator 7 based on a pilot signal in order to provide an audio signal having right (R) and left (L) signals.

Thus, noise is eliminated, so that sound having good quality is obtained.

However, if the closing time of the gate 3 becomes long, a sub signal included in the composite signal is reduced, which causes the demodulated signal to distort. In the conventional circuit, therefore, the closing time of the gate 3 is set at 10 μsec to 20 μsec by a timer provided in a gate control circuit (not shown). However, the noise can not be completely eliminated.

SUMMARY OF THE INVENTION

The object of the present invention is to provide a noise suppressing circuit which may reliably eliminate various types of noise.

According to the present invention, there is provided a noise suppressing circuit in a FM tuner having a gate for controlling a composite signal applied to a stereo demodulator of the FM tuner, a capacitor for charging a voltage at an output terminal of the gate, and a detector for detecting noise included in the composite signal and for producing a noise dependent signal for controlling the gate to close it.

The circuit comprises a pilot signal detector for signal the included in the composite signal and for producing pilot dependent pulses to the stereo demodulator, pulse generator means responsive to the pilot dependent pulses for producing control pulses having a shorter period than a period of the pilot signal, and gate control circuit means, connected to the detector and the pulse greater means for producing gate closing pulses during the noise dependent synchronism with the control pulses. The gate is responsive to each of the gate closing pulses for closing the gate for the period of the gate closing pulse, whereby a voltage charged in the capacitor before the closing of the gate is outputted.

On one aspect of the invention, the gate control circuit means includes an exclusive OR gate responsive to the pilot dependent pulses, and a gate control circuit responsive to the noise dependent signal and to output pulses from the exclusive OR gate, for producing the gate control pulses by dividing the noise dependent signal with the output pulses.

The other object and features of this invention will become understood from the following description with reference to the accompanying drawings.

BRIEF DESCRIPTION OF DRAWINGS

FIG. 5a shows a time chart of a gate of the conventional circuit; and

FIG. 5b shows a waveform of a composite signal controlled by a gate.

DETAILED DESCRIPTION OF THE PREFERRED EMBODIMENTS

Figure 1:
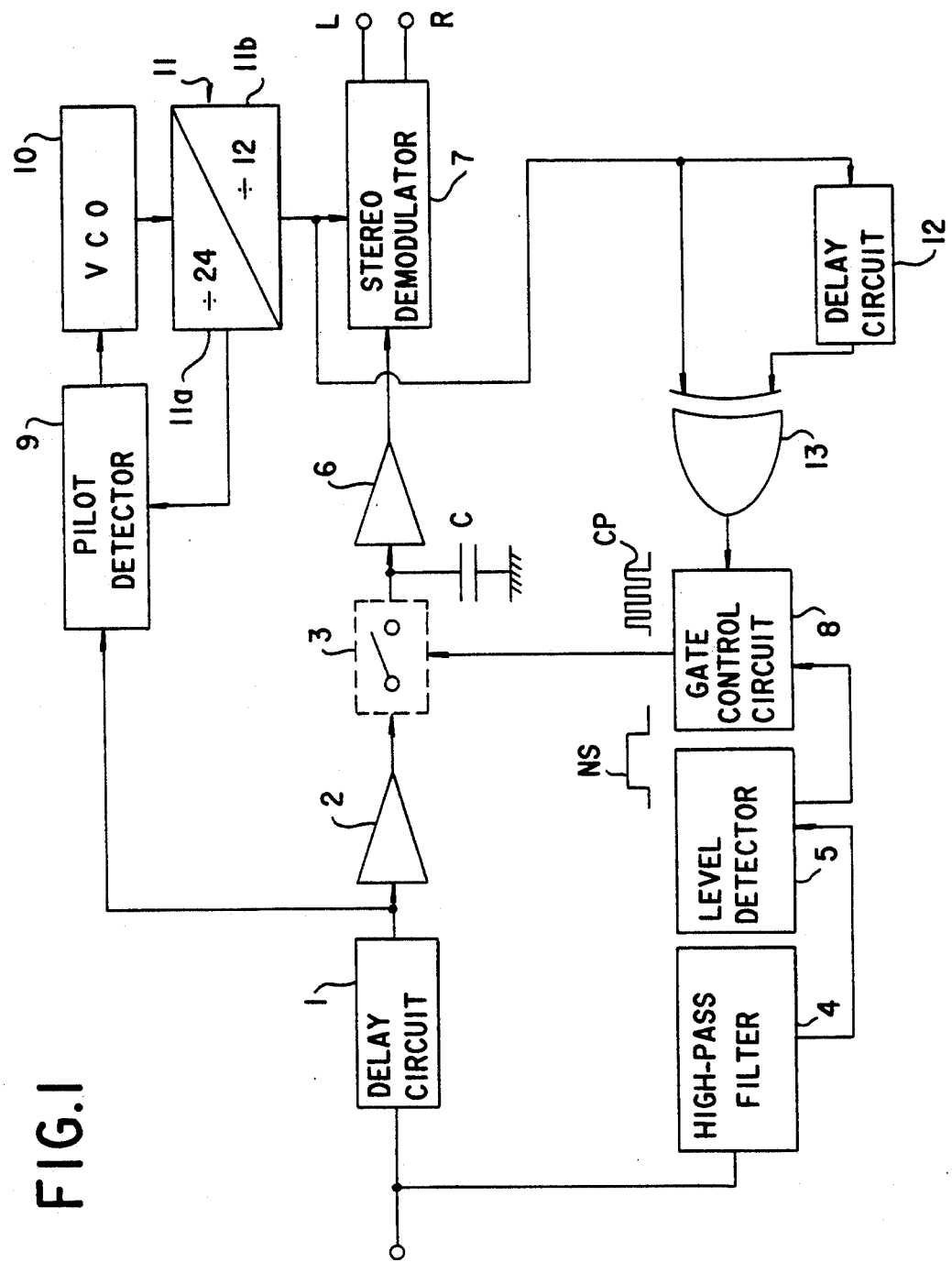
FIG. 1 shows a noise suppressing circuit according to the present invention.
Figure 3:
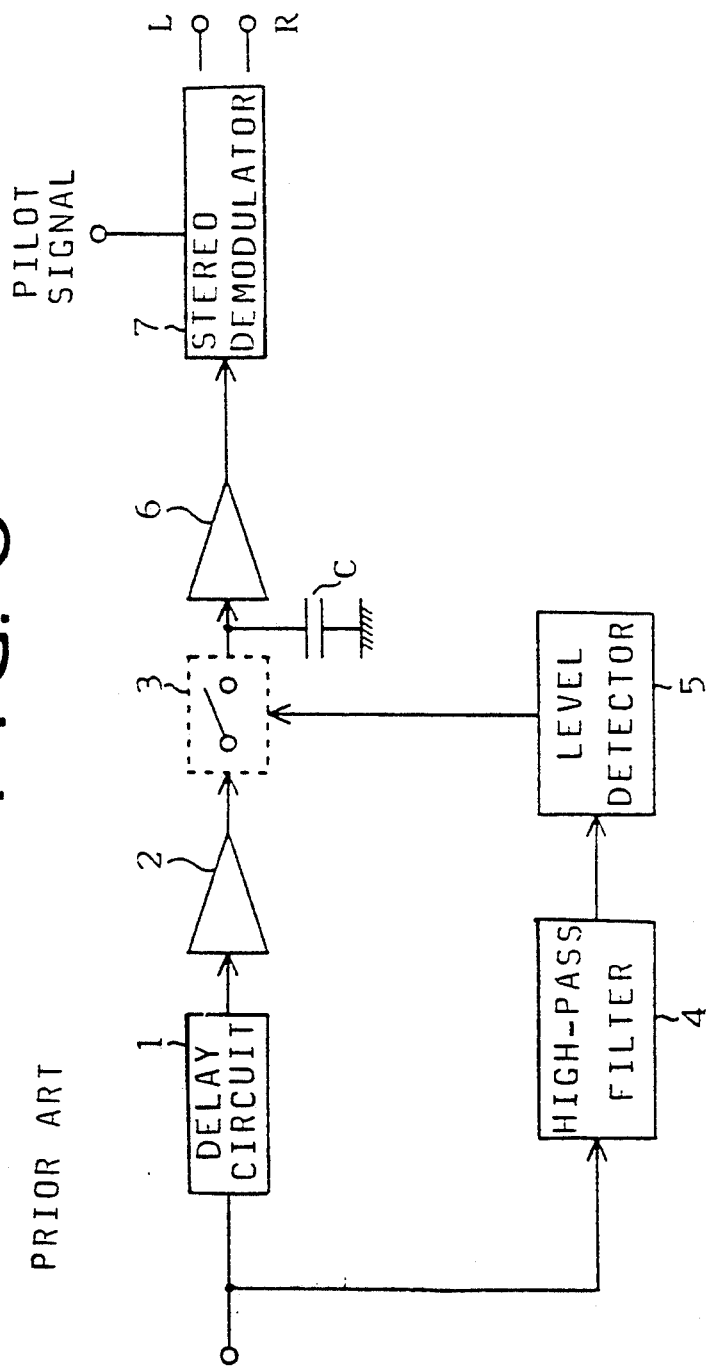
FIG. 3 a conventional noise suppressing circuit.
Figure 4:
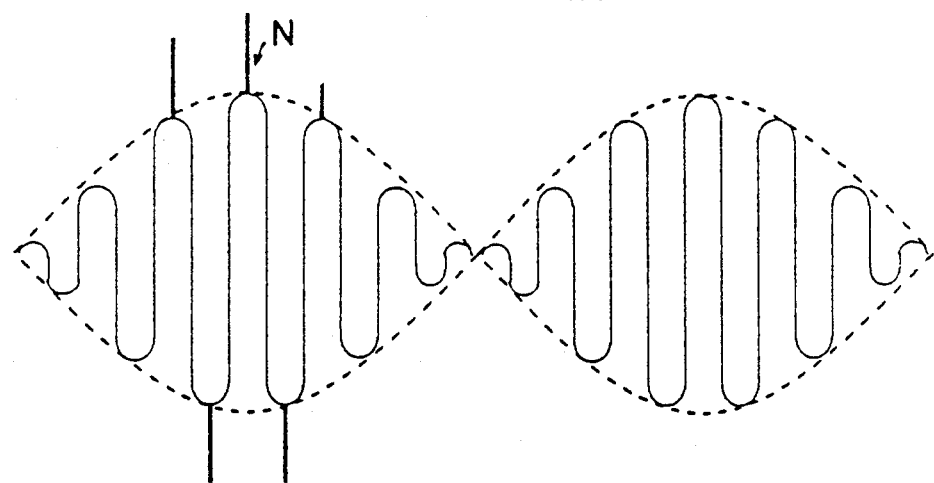
FIG. 4 shows a waveform of a composite signal including noise in the conventional circuit.

Referring to FIG. 1, a noise suppressing circuit of the present invention has the same elements as the conventional noise eliminating circuit of FIG. 3 as delay circuit 1, buffer amplifier 2, gate 3, high-pass filter 4, level detector 5, capacitor C, buffer amplifier 6, and stereo demodulator 7.

The circuit further comprises a gate control circuit 8 connected between the level detector 5 and the gate 3. The delay circuit 1 is further connected to a pilot detector 9 for detecting a pilot signal included in the composite signal. The pilot detector 9 is connected to a voltage-controlled oscillator (VCO) 10 which is connected to a frequency divider 11 having a 1/24 divider 11a and a 1/12 divider 11b. The 1/24 divider 11a is connected to the pilot detector 9. The 1/12 divider 11b is connected to the stereo demodulator 7, a delay circuit 12 and an exclusive OR gate 13. The output of the delay circuit 12 is connected to the exclusive OR gate 13 which is in turn connected to the gate control circuit 8.

Describing the operation, the delayed composite signal from the delay circuit 1 is applied to the buffer amplifier 2 and the pilot detector 9. The pilot detector 9 detects the pilot signal in the composite signal and produces a pilot base signal which is applied to the VCO 10. The VCO starts oscillation based on the pilot base signal voltage of the input signal. An oscillated signal is applied to the frequency divider 11. A signal having a frequency divided in the 1/24 divider 11a is fed back to the pilot detector 9. A signal having frequency divided in the 1/12 divider 11b is applied to the demodulator 7, delay circuit 12 and an input terminal of the exclusive OR gate 13. In the delay circuit 12, the signal from the divider 11b is delayed, and a delayed signal is applied to the other input terminal of the exclusive OR gate 13. The exclusive OR gate 13 produces control pulses each having a very small pulse width in accordance with the delaying period of the delayed signal from the delay circuit. The control pulses are applied to the gate control circuit 8.

Meanwhile the level detector 5 produces a noise dependent signal NS in accordance with noise included in the composite signal.

The gate control circuit 8 divides the signal NS into a plurality of gate control pulses CP each having a small pulse width in accordance with the control pulses from the exclusive OR gate 13. The gate control pulses CP are applied to the gate 3 to close it. Therefore, the voltage at the output terminal of the gate 3 is held in the capacitor C at every control pulse CP.

Figure 2:
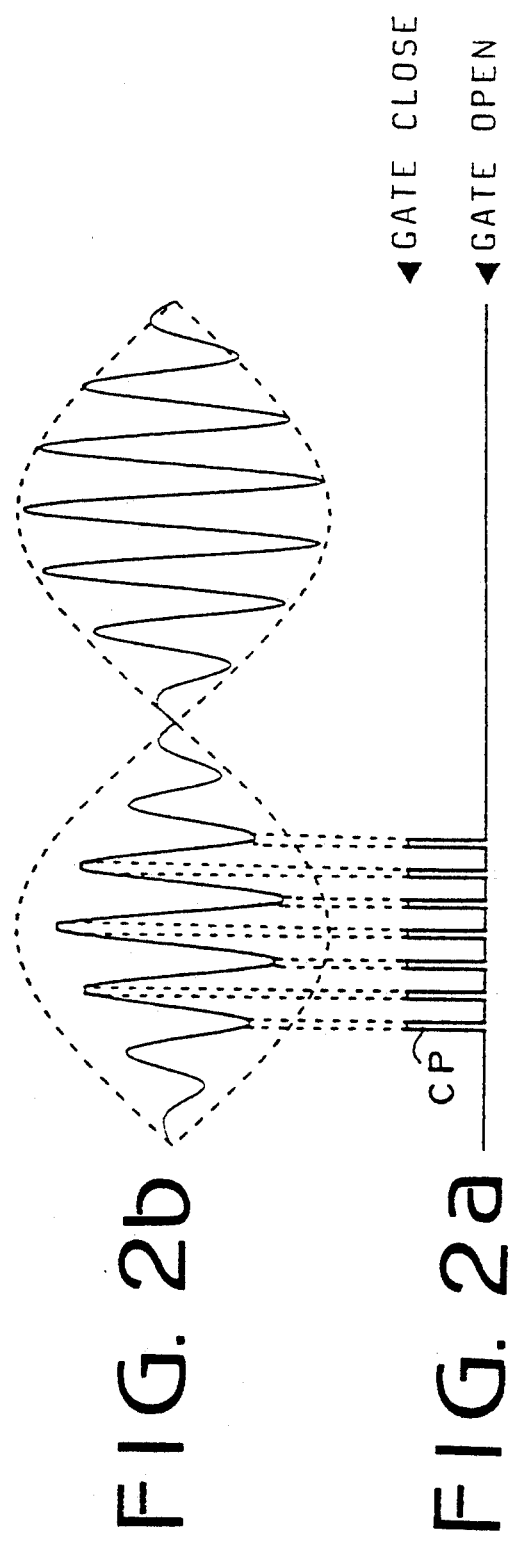
FIG. 2a shows a waveform of a gate control signal from a gate control circuit of the noise suppressing circuit.
FIG. 2b shows a waveform of a composite signal controlled by the gate of the noise suppressing circuit.

Thus, the waveform of the output signal of the buffer amplifier 2 is approximately kept as shown in FIG. 2b. The demodulator 7 demodulates the composite signal from the buffer amplifier 6 to the audio signal based on the output from the 1/12 divider 11b. Thus, the sub signal in the composite signal is maintained so that having good quality is obtained.

In accordance with the present invention, the gate is controlled in synchronism with the pilot signal included in the composite signal. Thus, the sub signal included in the composite signal is prevented from reducing. Accordingly, it is possible to increase the opening time of the gate, thereby sufficiently suppressing the noise.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A noise suppressing circuit in an FM tuner having a gate for controlling a composite signal applied to a stereo demodulator of the FM tuner, a capacitor for charging a voltage at an output terminal of the gate, and a detector for detecting noise included in the composite signal and for producing a noise dependent signal for controlling the gate to close it, the circuit comprising:

a pilot signal detector circuit means for detecting a pilot signal included in the composite signal an for outputting pilot dependent pulses to the stereo demodulator;

pulse generator means responsive to the pilot dependent pulses, for producing control pulses having a period shorter than a period of the pilot dependent pulse; and gate control circuit means operatively connected to said detector and to said pulse generator means, for dividing the noise dependent signal with the control pulses so as to produce gate closing pulses during the noise dependent signal in synchronism with the control pulses, the gate being connected to receive the gate closing pulses at a control input so as to close the gate for the period of the gate closing pulse, wherein a voltage charged in the capacitor before the closing of the gate is outputted.

2. The circuit according to claim 1 wherein said pulse generator means includes an exclusive OR gate and a delay circuit operatively connected to said pilot signal detector circuit means such that the exclusive OR gate received the pilot dependent pulses and the delayed pilot dependent pulses from the delay circuit so as to produce the control pulses, and said gate control circuit means has a gate control circuit responsive to the noise dependent signal and to the control pulses of the exclusive OR gate for producing the gate control pulses.

3. A noise suppressing circuit for a composite signal in an FM tuner, comprising:

an input gate through which the composite signal is input through to a stereo demodulator of the FM tuner, said input gate having a control input for receiving gate control pulses;

a stereo demodulator connected to an output of said input gate;

a capacitor for charging a voltage at an output of said input gate;

a pilot signal circuit means for detecting a pilot signal included in the composite signal and for outputting pilot dependent pulses based on the detected pilot signal to said stereo demodulator;

a noise detector circuit means for detecting noise included in the composite signal, and for producing a noise dependent signal based on the detected noise; and gate control circuit means operatively connected so as to receive the noise dependent signal from said noise detector circuit means and the pilot dependent pulses from said pilot signal circuit means, for outputting gate control pulses based on the noise dependent signal and the pilot dependent pulses so as to control opening and closing of said input gate, said gate control circuit means being further connected so as to output the gate control pulses to the control input of said input gate.

4. A circuit according the claim 3, wherein said gate control circuit means includes an exclusive OR gate with a delay circuit operatively connected to said pilot signal circuit means such that the exclusive OR gate receives the pilot dependent pulses and the delayed pilot dependent pulses from the delay circuit so as to produce the control pulses, and a gate control circuit responsive to the noise dependent signal and to the control pulses of the exclusive OR gate so as to produce the gate control pulses, the gate control circuit being operatively connected so as to receive the noise dependent signal and control pulses of the exclusive OR gate, and so as to output the gate control pulses to said input gate, the gate control circuit generating the gate control pulses by dividing the noise dependent signal with the control pulses from the exclusive OR gate.

5. A circuit according to claim 3, wherein said pilot signal circuit means includes a pilot signal detector means for detecting the pilot signal from the composite signal, and for outputting a pilot base signal generated from the pilot signal, a voltage-controlled oscillator, the voltage-controlled oscillator being connected so as to oscillate in response to the pilot base signal, and so as to generate an oscillated signal based on the pilot base signal, and a frequency divider means connected so as to receive the oscillated signal from the voltage-controlled oscillator, for dividing the oscillated signal, the frequency divider means having a first divider and a second divider, the first divider connected so as to output a feedback signal based on a fist predetermined divided frequency to the pilot signal detector, and the second divider connected so as to output the pilot dependent pulses to said stereo demodulator and said gate control circuit means based on a second predetermined divided frequency.

* * * * *